United States Patent [19]
Kessell et al.

[11] 3,740,019
[45] June 19, 1973

[54] ZERO DISPLACEMENT DIAPHRAGM VALVE

[75] Inventors: Archie Kessell, Huntington Beach; Charles Stephens Phelan, Tustin, both of Calif.

[73] Assignee: Rohe Scientific Corporation, Santa Ana, Calif.

[22] Filed: Dec. 2, 1971

[21] Appl. No.: 204,278

[52] U.S. Cl. .............................. 251/129, 251/331
[51] Int. Cl. ..................... F16k 7/12, F16k 31/06
[58] Field of Search ................ 251/129, 141, 331, 251/54

[56] References Cited
UNITED STATES PATENTS

| | | | |
|---|---|---|---|
| 3,098,635 | 7/1963 | Delaporte et al. | 251/129 X |
| 2,552,479 | 5/1951 | Copping | 251/54 |
| 2,325,264 | 7/1943 | Merten | 251/54 X |
| 3,459,404 | 8/1969 | Wisniewski | 251/141 |
| 2,842,400 | 7/1958 | Booth et al. | 251/331 X |
| 2,619,986 | 12/1952 | Goepfrich | 251/129 |

*Primary Examiner*—Arnold Rosenthal
*Attorney*—Ford W. Harris, Jr., Warren L. Kern, Donald C. Russell et al.

[57] ABSTRACT

A fluid valve which upon opening or closing does not displace any fluid in the system because the volume in the fluid line is maintained constant. This is accomplished by means of an actuator operated flexible diaphragm which faces the fluid line and which, on its opposite side, faces a sealed chamber completely filled with a liquid, such as water. When the diaphragm is moved away from the chamber, its central portion closes the valve. Since the volume in the chamber will not change, the diaphragm will flex and accordingly the volume in the fluid line will not change. The actuator is within the sealed chamber and is electromagnetically movable by a coil as in a solenoid.

1 Claim, 5 Drawing Figures

PATENTED JUN 19 1973 3,740,019
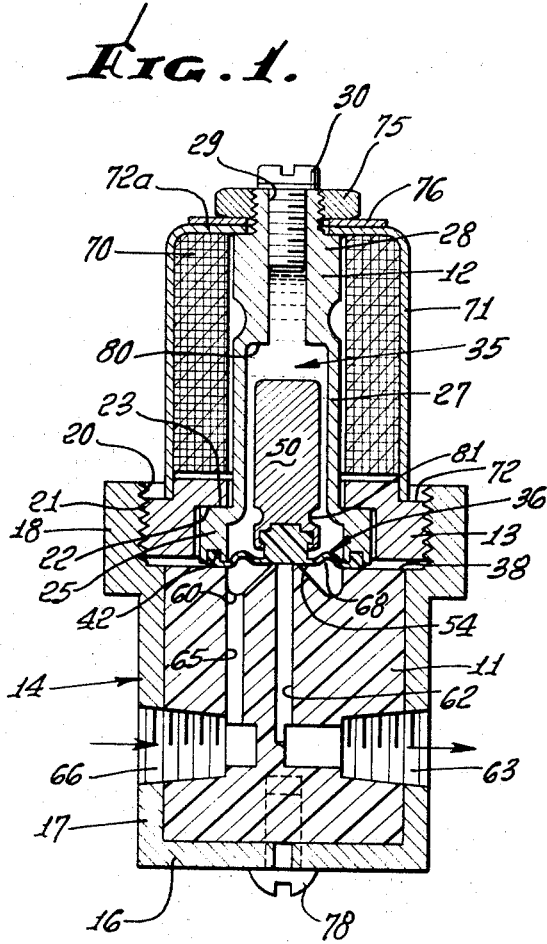
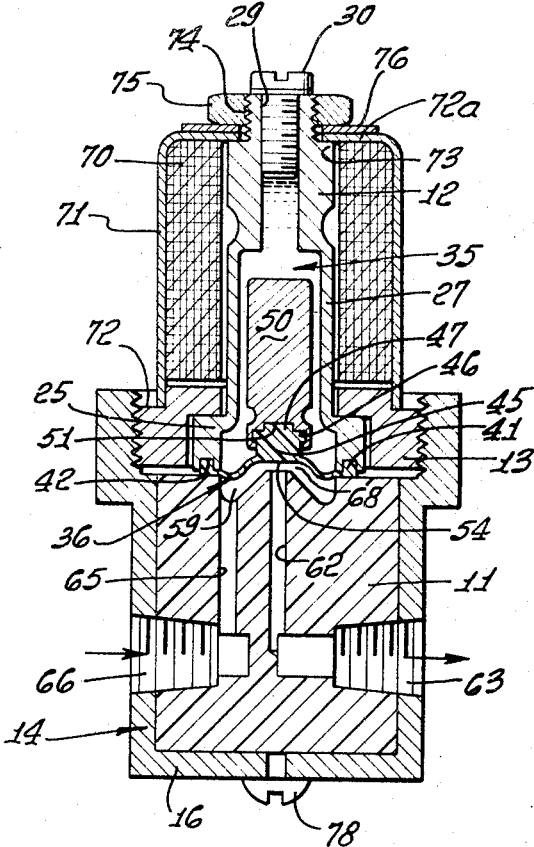
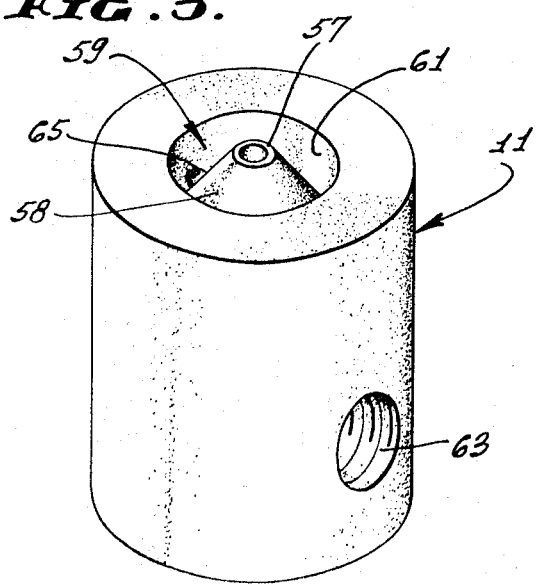
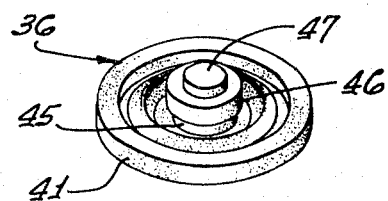
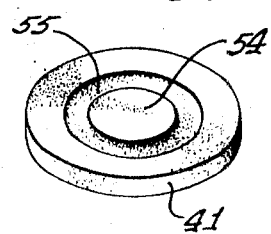

ZERO DISPLACEMENT DIAPHRAGM VALVE

BACKGROUND OF INVENTION

The present invention relates to a fluid valve having the characteristic of not having any dynamic or kinetic effect upon the fluid when the valve is opening or closing. During initial opening or closing there are no surges or severe back pressures that develop in the fluid lines, as is presently encountered, for example, in the ordinary household sink valve. These phenomena are sometimes referred to as pumping actions. The valve of the instant invention is aptly described as a zero displacement valve because it does not displace any fluid when moving from an open to a closed position, or vice versa.

The valve of the present invention is particularly useful in medical and chemical laboratories in conjunction with apparatus designed to dispense or meter precise volumes of fluid. The fluids utilized in many cases are highly corrosive, such as acids, and therefore the valve is constructed so that the acid will only contact corrosive-resistant parts. This is accomplished by a unique configuration of the valve whereby the actuating mechanism is completely isolated from the fluid.

SUMMARY AND OBJECTS OF INVENTION

A general object of the present invention is to provide a fluid valve which develops little or no pumping action when opening or closing.

More particularly, it is an object of the present invention to provide a fluid valve of the foregoing nature in which a precise amount of fluid may be passed through the valve, and the volume thereof will be precisely determinate because of stabilization of pressure within the system.

A further object is to provide a fluid valve particularly useful in automated clinical or chemical laboratories which is capable of passing fluids which, due to the function of the valve, can be measured with precise accuracy.

Another object is to provide a fluid valve of the foregoing character in which all of the components in contact with the fluid are made of inert and non-corrosive materials. A related object is to provide such a valve with the actuator isolated from the fluid path.

A more particular object is to provide a fluid valve wherein the actuator is disposed within an actuator chamber completely filled with an inert incompressible liquid, such as water, and the actuator is connected to a diaphragm, and the diaphragm faces a valve seat chamber containing the fluid to be metered, whereby movement of the actuator results in flexing of the diaphragm so as not to alter the volume in the valve seat chamber.

The foregoing objects, advantages, features and results of the present invention, together with the various other objects, advantages, features and results thereof which will be evident to those skilled in the art to which the invention relates in the light of this disclosure, may be achieved with the exemplary embodiment of the invention illustrated in the accompanying drawing and described in detail hereinafter.

DESCRIPTION OF DRAWING

FIG. 1 is an elevational cross-sectional view of the valve in the closed position;

FIG. 2 is the same view as in FIG. 1 but with the valve in an open position;

FIG. 3 is an enlarged perspective view of the body or core of the valve illustrating a portion of the fluid flow areas;

FIG. 4 is a considerably enlarged perspective view of the valve diaphragm illustrating the top surface thereof adjacent to the actuator; and FIG. 5 is a perspective view of the opposite side of the diaphragm of FIG. 4 illustrating the surface thereof that faces the valve seat chamber.

DESCRIPTION OF EXEMPLARY EMBODIMENT OF INVENTION

In the drawing, the valve of the present invention is illustrated in FIGS. 1 and 2, the renditions being the same, except FIG. 1 illustrates the closed position and FIG. 2 illustrates an open position. The valve is constituted in part by a housing comprising a body or core 11, a tubular member 12, and a locknut 13 that secures the body 11 and member 12 in rigid relationship, as will be described hereinafter. All of these elements are generally cylindrical in configuration, as are the majority of the assembly components.

The body 11 is made of a rigid polymeric or plastic material, such as polytetrafluoroethylene. Such material is known as Teflon or Fluorogold, which is inert, corrosive-resistant, and impervious to most fluids, such as acids. Inasmuch as some polymeric or plastic materials are pliable, the body 11 is provided with a case generally indicated by the arrow 14, preferably made of aluminum, which has a bottom portion 16 and a side portion 17 for reinforcing the body 11. The case 14 also has an enlarged annular top portion 18 which is recessed so as to threadably receive the locknut 13 and other components to be described hereinafter. The inside diameter of the top portion 18 is provided with threads 20 which cooperate with corresponding threads 21 on the locknut to urge the tubular member 12 toward the body 11 during assembly of the components. In this connection the locknut 13 is undercut forming an annular surface 22 which engages a corresponding surface 23 on a lower enlarged base 25 of the tubular member 12.

Referring now to the tubular member 12, extending upwardly of the base 25 is a tubular section 27 of reduced outside diameter and reduced inside diameter. Extending upwardly of the section 27 is a coterminous head section 28 having a further reduced inside diameter which is threaded at its upper extremity indicated by the numeral 29 to receive a cap screw 30. It will be noted at this juncture that the volumes confined by the head section 28, the tubular section 27 and the base 25 may be conveniently referred to as an armature or ballast chamber indicated generally by the numeral 35.

The armature chamber 35 is closed at its lower end by a diaphragm 36 which is mounted in position by the base 25 of the tubular member 12 and an upper surface 38 of the body 11. The diaphragm is made of a rubberous or elastomeric material, such as vinyl, and is corrosion-resistant to fluids, such as acid.

Referring to FIG. 2, and to FIGS. 4 and 5 for details of the diaphragm 36, the diaphragm is formed with a peripheral upstanding annular lip 41 which is adapted to be received into an annular recess 42 formed in the bottom of the base 25. When the unit is fully assembled, the base 25 urges the bottom of the lip 41 into firm engagement with the surface 38 of the body 11, thereby sealing off the armature chamber 35. Centermost of the top of the diaphragm is an upstanding connector 45 which is provided with an enlarged annular flange 46 intermediate its ends, thereby providing a crown 47 uppermost of the flange 46. The connector 45 is connected to an actuator or armature 50 (see FIG. 2). The armature 50 is made of a ferromagnetic material that is preferably corrosion-resistant to water. It is fabricated at its lower end to provide a coaxial opening 51 corresponding in dimension to the configuration of the connector 45 of the diaphragm. Since the connector is rubber-like, it can be conveniently deformed and introduced into opening 51, the flange 46 when in place locking the parts together and the crown 47 providing for the required alignment to maintain the actuator 50 substantially centrally of the armature chamber 35.

Referring now to FIG. 5, the bottom of the diaphragm 36 has a central valve element 54 opposite the connector 45. Peripherally coterminous with the valve element 54 is a flexible element 55 which in turn terminates at the annular lip 41.

Referring to FIGS. 1 and 2, the valve element 54 is coaxial with the armature chamber 35 and is adapted to move upwardly and downwardly in response to movement of the armature 50. In FIG. 1, the valve seat 54 is illustrated in full engagement with a valve seat 57 (see FIG. 3) of the body 11. The valve seat 57 is formed at the apex of a cone 58 formed in the body 11. The body is fabricated at its upper end so as to provide an annular recess 59 surrounding the valve seat, and in which the cone is preferably centrally located. The recess extends downwardly along the side of the cone 58 to the curved bottom generally designated by the numeral 60 and then upwardly along the side wall indicated by the numeral 61.

The body 11 is provided with a central bore 62 communicating through the valve seat 57, the bore 62 in turn communicating with an outlet port 63. The body also is provided with an offset bore 65 communicating with the recess 59 which in turn communicates with an inlet port 66. The inlet and outlet ports 66 and 63 are suitably taper threaded in the body 11 as well as the side portion 17 of the case 14 to receive corresponding male threaded fittings and associated plumbing for conveyance of the fluid being metered through the valve. These fittings (not shown) are preferably made of a corrosion-resistant polymeric or plastic and are threaded sufficiently into the ports 63 and 66 so that the fluid will not contact the case 14.

It will now be observed that there is a chamber, conveniently designated as a valve seat chamber 68 (see FIG. 2) immediately below the diaphragm 36, and the valve seat 57 is disposed in this chamber 62 facing the armature chamber 35.

The annular recess 59 which forms a part of the valve seat chamber 68 preferably completely surrounds the valve seat. This configuration may be compared to an earth volcano having a lid, although in the valve embodiment illustrated the flow of fluid is illustrated in reverse to that of an earth volcano.

The actuator 50 in the embodiment illustrated is electromagnetically operated by means of a conventional electrical coil 70 telescoped over the tubular member 12. The coil 70 is housed by a cylindrical case 71, which is supported at its lower periphery upon a shoulder 72 provided by the locknut 13. The case is rigidly secured at its upper end by an inwardly projecting annular flange 72 engaging an annular shoulder 73 of the tubular member 12 which is externally threaded at its upper extremity 74 to receive a locknut 75. For assurance of rigidity, a washer 76 may be disposed intermediate the top of the case 71 and the locknut 75.

Similarly, for rigidity, at the bottom of the valve a screw 78 may be threaded to the bottom portion 16 of the case 14 and into the body 11. In clinical laboratory usage wherein precise accuracy is required, rigidity is paramount. In this instance, wherein the body 11 may be made of Teflon or Fluorogold, and the case 14 was not employed, it is possible that the internal pressures in the body 11 developed by the fluid may cause distortion resulting in volumetric changes within the valve system that cannot be tolerated.

Referring to FIGS. 1 and 2, the armature or ballast chamber 35 is filled with a liquid, preferably water, although other liquids could be used if damping characteristics are required or desired. Water is introduced through the opening in the top of the tubular member 13 which in turn is closed off by the cap screw 30.

The water in the armature chamber 35 is therefore confined by the tubular member 12, the cap screw 30 and the diaphragm 36. The armature 50 is completely immersed in the water. The chamber 35 is capable of varying in shape due to the flexible diaphragm 36. However, the volumetric capacity of the chamber 35 is constant. Thus, any movement of the armature will result in a movement of the diaphragm resulting in a movement or shifting of water in the chamber 35. The shift is concentrated primarily at the flexible element 55 of the diaphragm 36, and the difference between FIGS. 1 and 2 illustrates a possible configuration of the diaphragm when the valve is closed, FIG. 1, and when open, FIG. 2.

Inasmuch as there is no change of volume at any time in the armature chamber 35, there is no change in volume on the opposite side of the diaphragm, although the diaphragm has changed in configuration in its flexible area 55. Therefore, there is no change in the volume in the valve seat chamber 68 opposite the diaphragm occasioned by movement of the armature.

The armature 50 functions in combination with the coil 70 as in a solenoid. When the coil is energized the armature 50 (commonly called the plunger in a solenoid) is pulled upwardly by the electromagnetic lines of force so as to open the valve (see FIG. 2). When the coil is de-energized the armature returns to the position illustrated in FIG. 1 by weight, or preferably by means of a coiled compression spring (not shown) disposed in the chamber 35 surrounding the armature and compressed between an internal shoulder 80 of the tubular member 12 and an annular groove 81 formed in the periphery of the armature.

It will now be understood that when the fluid flow is interrupted and the valve is closed as illustrated in FIG. 1, the fluid, for example acid, will fill the valve seat chamber 68 and be under a pressure as a function of the pressure at the inlet port 66. When the valve is opened as illustrated in FIG. 2, the acid will immediately flow past the valve seat 57 and into the bore 62. However, during the transitional movement of the diaphragm 36 caused by the actuator 50 there is no dynamic action upon the fluid being metered, except for the small local eddy that may develop as a result of the diaphragm flexure.

It will also now be understood that the valve of the instant invention is particularly useful in the metering or passing of a corrosive fluid wherein control is accomplished by an actuating means isolated from the corrosive fluid. Further, in the embodiment illustrated, the fluid will only be on contact with the material constituting the body 11 and the bottom area of the diaphragm 36, both of which are corrosion-resistant.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim:

1. In a zero displacement diaphragm valve, the combination of:
   a. a housing having coaxial actuator and valve seat chambers;
   b. a valve seat coaxial with said actuator and valve seat chambers, said valve seat being disposed in said valve seat chamber and facing said actuator chamber, said valve seat being generally frusto-conical in form and tapering outwardly and away from said actuator chamber and having a central valve port therein communicating with said valve seat chamber;
   c. said housing being provided with ports respectively communicating with said valve seat chamber and said valve seat;
   d. a diaphragm carried by said housing and separating said valve seat chamber and said actuator chamber and including a valve element engageable with said valve seat, the periphery of said diaphragm being secured to said housing in substantially the same plane as the small end of said valve seat, said diaphragm being movable between a closed position in which the central portion thereof engages said small end of said valve seat to close said valve port and an open position in which said central portion is displaced away from said valve port to open the same, said diaphragm when in said open position being deformed to provide an annular surface generally parallel to the outer frusto-conical surface of said valve seat to form a generally frusto-conical fluid passage therebetween directing fluid flow from said valve port to the housing port communicating with said valve seat chamber;
   e. an actuator in and movable axially of said actuator chamber and connected to said diaphragm so as to move said valve element toward and away from said valve seat;
   f. a liquid in and filling said actuator chamber; and
   g. means for moving said actuator.

* * * * *